(12) United States Patent
Romanus

(10) Patent No.: US 7,785,412 B2
(45) Date of Patent: Aug. 31, 2010

(54) ADDITIVATED COAL DUST WITH WATER SOLUBLE CARBOHYDRATES FOR USE IN THE GREEN SAND COMPOSITION FOR CASTING MOLDING

(75) Inventor: Arnaldo Romanus, João Pessoa—Paraiba (BR)

(73) Assignee: Coque Do Sul Do Brasil Ltda, Criciuma-Santa Catarina (BR)

( * ) Notice: Subject to any disclaimer, the term of this patent is extended or adjusted under 35 U.S.C. 154(b) by 0 days.

(21) Appl. No.: 12/373,925

(22) PCT Filed: Feb. 12, 2008

(86) PCT No.: PCT/BR2008/000046

§ 371 (c)(1),
(2), (4) Date: Jan. 15, 2009

(87) PCT Pub. No.: WO2008/098333

PCT Pub. Date: Aug. 21, 2008

(65) Prior Publication Data

US 2009/0283011 A1    Nov. 19, 2009

(30) Foreign Application Priority Data

Feb. 12, 2007   (BR) .................................. 0700507

(51) Int. Cl.
*B22C 1/00* (2006.01)
*B22C 1/26* (2006.01)
*C01B 31/00* (2006.01)

(52) U.S. Cl. ................. 106/38.51; 106/38.2; 106/38.22; 106/38.23; 106/217.7; 106/285; 106/287.26; 106/476; 106/708; 106/DIG. 1

(58) Field of Classification Search ................. 106/38.2, 106/38.22, 38.23, 38.51, 708, DIG. 1, 217.7, 106/285, 287.26, 476

See application file for complete search history.

(56) References Cited

U.S. PATENT DOCUMENTS

| 2,984,627 | A |   | 8/1960 | Field |
| 4,582,511 | A | * | 4/1986 | Siddoway et al. .............. 44/577 |
| 4,642,196 | A | * | 2/1987 | Yan .............................. 299/12 |
| 7,101,493 | B2 | * | 9/2006 | Colucci ...................... 252/88.2 |
| 2003/0041509 | A1 | * | 3/2003 | Cutright et al. ................ 44/553 |
| 2005/0139804 | A1 | * | 6/2005 | Colucci ...................... 252/88.1 |
| 2006/0243946 | A1 | * | 11/2006 | Wolff ......................... 252/88.1 |

FOREIGN PATENT DOCUMENTS

| DE | 3841473 | 6/1990 |
| DE | 19609539 | 9/1997 |
| WO | WO 2008/046172 | 4/2008 |

* cited by examiner

*Primary Examiner*—Anthony J Green
(74) *Attorney, Agent, or Firm*—B. Aaron Schulman; Stites & Harbison PLLC

(57) ABSTRACT

Coal dust additivated with water soluble carbohydrates for use in the green sand composition for molding of castings refers to a process for obtaining coal additivated with carbohydrates to be used in the green molding sand composition, commonly used for making casting molds, having as a scope to inhibit the sand sintering on the castings and so to improve their finish.

6 Claims, No Drawings

ADDITIVATED COAL DUST WITH WATER SOLUBLE CARBOHYDRATES FOR USE IN THE GREEN SAND COMPOSITION FOR CASTING MOLDING

This invention patent refers to an additivated coal composition with carbohydrates for use in green molding sand commonly used for making casting molds, and with the scope of inhibiting the sand sintering on the parts, thus improving their finish.

The product now described belongs to the chemical industry field and has the purpose of supplying the market with a highly functional additivated coal dust, allowing even a greater reutilization of the returning sand in foundries, resulting in a number of benefits as it will be evidenced in this report.

It is important to point out that the inventor, with the aim of improving the green sand composition, has already developed an additivated bentonite composition according to PI 0604327-5, filed in Oct. 20, 2006, designated as "ADDITIVATED SODIUM BENTONITE FOR USE IN GREEN SAND FOR PART MOLDING IN FOUNDRIES", and the issues described in this report are a continuation of the inventor's studies.

The so-called green sand consisting of silica sand, mineral coal dust, bentonite or clay and water composition, is traditionally known for its use in making metal foundry molds and has to offer a high compactibility that is enough to result in a good mold plasticity, preventing its breakage, specially during the casting extraction.

Another important aspect of the green sand composition is the fact that it cannot show a high moisture content, otherwise a sufficient mixture fluidity will not be obtained so as to allow for getting the proper mold consolidation, thus preventing breakages and erosion during the metal pouring.

Therefore, in order that the green sand shows a good compactibility and low moisture contents, the foundries can apply some resources, among them we can mention the partial substitution of wastes resulting from the molding procedure (with the great disadvantage of increasing the contaminated material disposal to the environment and making the obtained product more expensive), in addition to suitability assumptions of the mixture components, such as the use of natural sodium bentonite, the increment of mineral coal dust, among others.

The fact is, depending on the mitigating alternative adopted, a significant worsening of other green sand characteristics can occur, distinguishing the wet tensile strength, the green compression strength and permeability, which can cause several failures or troubles on the casting.

As an example, we can mention one of the most known troubles concerning the excessive green sand moisture, that causes metal oxidation resulting in sand sintering to the parts, in addition to its bad finish.

As to the sintering problem, the coal dust, known for being a pure vitreous carbon generator, inhibits the sand sintering, however its excessive use brings the collateral effect of producing gases on the parts.

Facing such facts, we already know about other researches using additivated coal powders with water insoluble hydrocarbons, however their use is generally too expensive and does not provide the reduction of returned foundry sand disposal on industrial landfills.

Based on the described troubles, the purpose of this patent designated as "COAL DUST ADDITIVATED WITH WATER SOLUBLE CARBOHYDRATES FOR USE IN THE GREEN SAND COMPOSITION FOR MOLDING OF CASTINGS" proposes a specific technical development required by the metal foundry industry allowing the reutilization of the mold disposal sand, so as to reduce the waste quantity on industrial landfills with advantages to the environment, since the molding sand compounds release the chemical substance sulfur and phenols, which substances are considered cancerous to the human being.

Other technical advantages consist in reducing the addition of silica base sand to the green sand, since the mold wastes considered harmful to the use of mineral powder do not cause any aggressive collateral effects when replaced by the additivated coal dust.

Furthermore, the use of additivated coal dust with carbohydrates as described in this patent allows a reduction up to 40% of bentonite or clay consumption in the green sand composition, due to the fact that it prevents the mechanical mold connections from breaking, as usually verified with the use of mineral coal.

It is also verified that using the additivated coal dust in the green sand composition allows the generation of a greater vitreous carbon quantity in the mold during the metal pouring, since it requires a smaller quantity of water to be added to the mixture, thus ensuring an outstanding finish to the cast product and considerably reducing the sand sintering on the parts.

And finally, as an additional advantage the coal dust additivated with carbohydrates allows to substantially reduce the need of using bentonite in automated molding processes, as it provides greater mechanical alloy to the mold.

The Invention

The purpose of this invention refers to an additivated coal dust with carbohydrates.

The mineral coal powder already known by the technique refers to the result of mineral coal extraction and refinement, to which other materials are exceptionally added, in order to improve some of its characteristics. Among them we distinguish the Green Petroleum Coke, which corresponds to a subproduct of the petroleum refinement with the purpose of reducing the ash content in the composition, and the asphaltite, which utilization in the coal dust occurs due to the low sulfur content it owns, what is really important to the foundries.

Thus the mineral coal dust is basically the result of the metallurgical coal drying and milling, that is obtained in several specifications, varying according to the batch received and having the main features: Ash, Sulfur, Volatile Material, Vitreous Carbon and Moisture. The typical characteristics of the mineral coal powder are as follows:

| Components | Minimum | Typical | Maximum |
| --- | --- | --- | --- |
| Ash | n/a | 14.0% | 15.0% |
| Sulfur | n/a | 1.4% | 1.5% |
| Volatile Materials | 30.0% | 34.0% | n/a |
| Vitreous Carbon | 9.0% | 10.1% | n/a |
| Moisture | n/a | 1.0% | 3.0% |
| Granulometry retained #40 | n/a | 0.0% | 5.0% |
| Granulometry retained #200 | 45.0% | 50.0% | 65.0% |

For this reason, according to the referred invention, the mineral coal dust as described above receives the addition of "carbon hydrates", also called carbohydrates, glycides, glucides, glucids, saccharides or sugars.

These organic substances are ternary compounds formed by carbon, hydrogen and oxygen in general, at the rate of one carbon for two hydrogens for one oxygen, that is: $C(H_2O)$, and nitrogen (N) or sulfur (S) can also be added to their composition. Chemically, the carbohydrates are defined as polyhydroxyaldehydes or Glucose ($C_6H_{12}O_6$) and/or polyhydroxyketones or Fructose ($C_6H_{12}O_6$).

We clarify that the carbohydrates used in this invention can be all the ones classified in the monosaccharide, oligosaccharide and polysaccharide categories, so that the obtained result will be the same.

The additivated coal dust obtainment occurs through the mechanical mixing of carbohydrates in a proportion determined by the previous analysis of the green sand components that will receive the referred component, at an ideal rate of 60% coal and 40% carbohydrates, being allowed to show a variation up to 10% for more or less the quantities above.

The optimum mixture temperature is set according to the component balance when applied to the green sand, and may vary between 0 and 70° C., the optimum temperature being set at maximum 40° C.

The final moisture percent of the mixture can vary between 0 and 5% and shall preferably be maintained as close to 0 as possible.

The chemical properties of the additivated coal dust described in this patent are given below:

Volatile Content: 40 to 65%, the ideal being 55%
Vitreous Carbon Content: from 12 to 20%, the ideal being 16%
Sulfur Content: from 0 to 1%, the ideal being 0%
Moisture Content: from 0 to 5%, the ideal being 0%

Ashes Content (waste material from calcination): from 0 to 10%, the ideal being 0%.

It is important to point out that the obtainment of the additivated coal dust mentioned results from the mixture of good quality mineral coal dust, after analyzing the needs of the green foundry sand.

EXAMPLE 1

Obtainment process of coal dust additivated by Carbohydrate-Saccharose

In order to obtaining additivated coal dust according to this invention, the mineral coal dust with the above described characteristics is used.

The carbohydrate additive used in this example corresponds to the oligosaccharide or small sugar group, that are carbohydrates composed of two to ten monosaccharide molecules, in this case saccharose.

The saccharose, corresponding to the traditional "sugar cane" or red beet sugar, usually known as refined sugar, is used in this example at an optimum proportion of 40% mechanically mixed to 60% of mineral coal dust, at a optimum maximum temperature of 40° C.

By this way, it is possible to obtain a coal dust additivated with saccharose, with a high content of vitreous carbon that inhibits the sand sintering on the castings, ensuring an outstanding finish to them.

Thus, the present invention was provided in order to obtain coal dust additivated with carbohydrate to be used in the green sand composition for making foundry molds, which greatly reduces the problems found today, and that is translated into a large number of benefits, distinguishing those for the environment by reducing the returned sand disposal, and to the excellent finish of the casting obtained by using the resulting product described in this invention.

The invention claimed is:

1. Coal dust composition with water soluble carbohydrates for use in a green sand composition for molding of castings comprising mineral coal dust and water-soluble carbohydrates at a proportion determined after a previous analysis of the green sand composition components, said proportion comprising 60% mineral coal dust and 40% of carbohydrates, and varying up to 10% with the following chemical properties: Volatile Content: 40 to 65%,
   Vitreous Carbon Content: from 12 to 20%,
   Sulfur Content: from 0 to 1%,
   Moisture Content: from 0 to 5%, and
   Ashes Content (waste material from calcination): from 0 to 10%.

2. The coal dust composition according to claim 1 wherein the composition presents a final moisture percent varying between 0 and 5%.

3. The coal dust composition according to claim 1 wherein said composition occurs through the addition of saccharose at an optimum proportion of 40% of refined sugar mechanically mixed to 60% of mineral coal dust, at a temperature not exceeding 40° C.

4. The coal dust composition according to claim 1 wherein the Volatile Content is 55%.

5. The coal dust composition according to claim 1 wherein the Vitreous Carbon Content: is 16%.

6. The coal dust composition according to claim 2 wherein the final moisture percent is as close to 0 as possible.

* * * * *